United States Patent [19]

Engel et al.

[11] Patent Number: 5,133,665
[45] Date of Patent: Jul. 28, 1992

[54] TEACHING BOOK

[76] Inventors: Shari G. Engel, 16771 Debra Cir.; Pamela A. Rossi, 16761 Debra Cir., both of Huntington Beach, Calif. 92647

[21] Appl. No.: 549,088
[22] Filed: Jul. 6, 1990
[51] Int. Cl.⁵ ............................................. G09B 1/12
[52] U.S. Cl. ........................................ 434/167; 434/192; 434/370; 446/147
[58] Field of Search ............... 434/167, 161, 172, 176, 434/178, 370, 317, 420; 446/147

[56] References Cited

U.S. PATENT DOCUMENTS

| | | | |
|---|---|---|---|
| 364,845 | 6/1887 | Oakley | 434/167 |
| 1,405,193 | 1/1922 | Faureau | 434/167 |
| 1,755,853 | 4/1930 | Waring | 434/167 |
| 2,167,131 | 7/1936 | Weidenborner | 434/427 X |
| 2,360,916 | 10/1944 | Von Trott | 446/147 |
| 2,493,668 | 1/1950 | Gonzalez | 434/167 |
| 3,793,758 | 2/1974 | Feldhusen et al. | 446/147 X |
| 4,070,768 | 1/1978 | Zuckerman | 434/427 |
| 4,363,081 | 12/1982 | Wilbur | 434/147 X |
| 4,650,426 | 3/1987 | Brigance | 434/178 X |
| 4,960,382 | 10/1990 | Alford | 434/172 X |

OTHER PUBLICATIONS

"Hauni-Maschinen" book, 1980/81.

Primary Examiner—Robert Bahr
Assistant Examiner—L. Thomas
Attorney, Agent, or Firm—Drucker & Sommers

[57] ABSTRACT

A book that can be customized to teach letters, numbers, a series of letters, for example, a word such as a child's name and the like. The front cover has a window or opening through which can be seen the letters. The series of letters is formed by cutting each page short enough than the page beneath it such that letters on the right edge form the series.

20 Claims, 2 Drawing Sheets

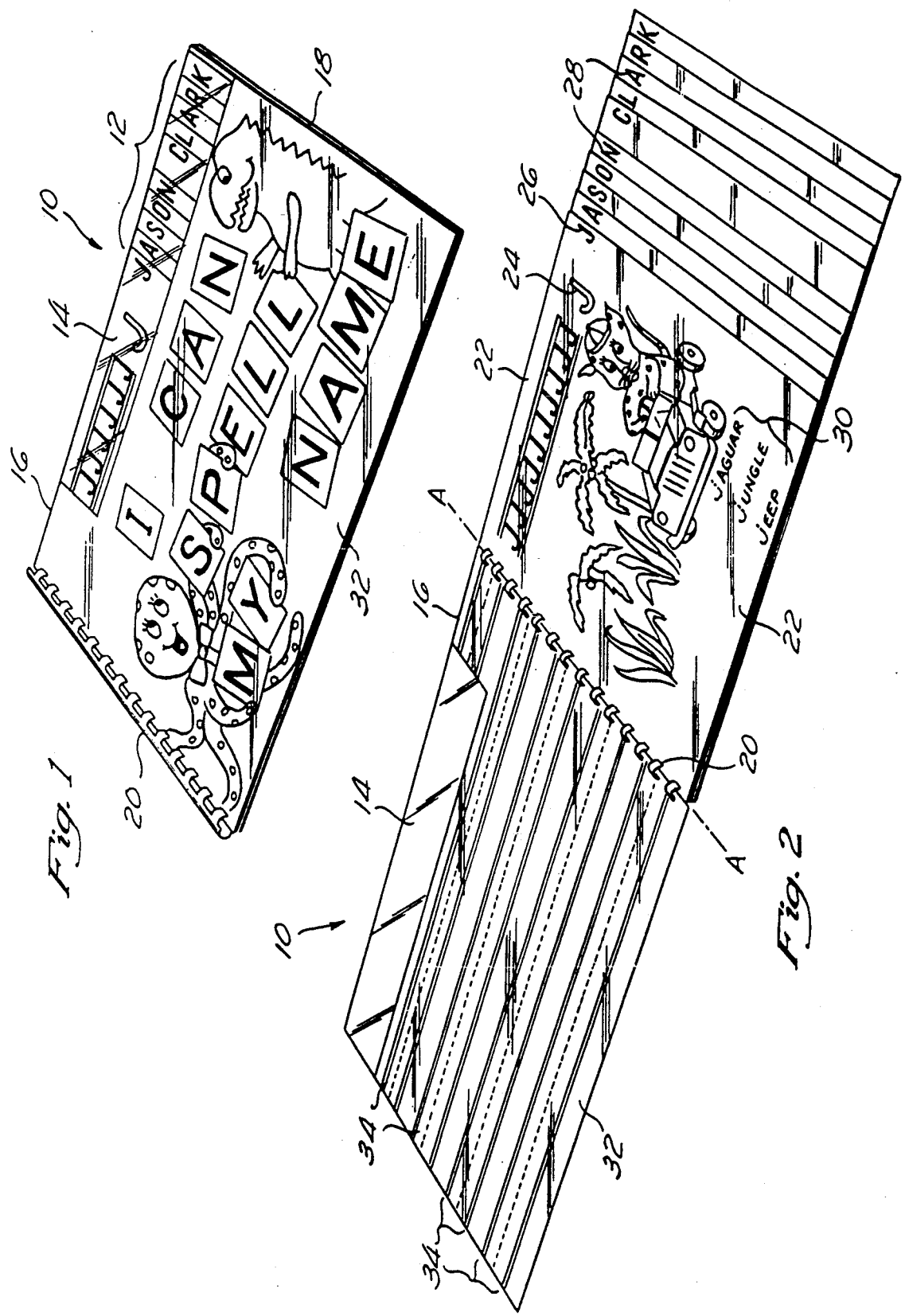

TEACHING BOOK

BACKGROUND OF THE INVENTION

This invention relates to books and devices to teach reading.

Several books to teach young children to read have been published. They have taken many formats. It has been found that books containing illustrations are more likely to retain a child's interest than an unillustrated book. Furthermore, a book with an activity is of even greater interest to a child. A variety of devices to would maximize the child's interest.

U.S. Pat. No. 4,702,700 issued to Taylor discloses a book having magnetic surfaces to attach representations of the subject of the book.

U.S. Pat. No. 4,176,473 issued to Rae discloses a book having removable figures, for example, figures of dinosaurs, mounted in the pages.

U.S. Pat. No. 3,028,178 issued to Pietrangeli et al. discloses a book having a plurality of separately bound pages. The child can then flip through the sections independently.

U.S. Pat. No. 4,640,512 issued to Burke discloses a book having pieces of a puzzle that can be assembled on each page.

None of the disclosed books have the advantage that they can be easily customized for a particular child reader. This feature would advantageously provide a vehicle so the child could learn to read and write his own name.

BRIEF DESCRIPTION OF THE DRAWINGS

FIG. 1 shows a top perspective view of the book of this invention in closed position.

FIG. 2 shows a top perspective view of the book of this invention open to the first page.

SUMMARY OF THE INVENTION

Figure 3:
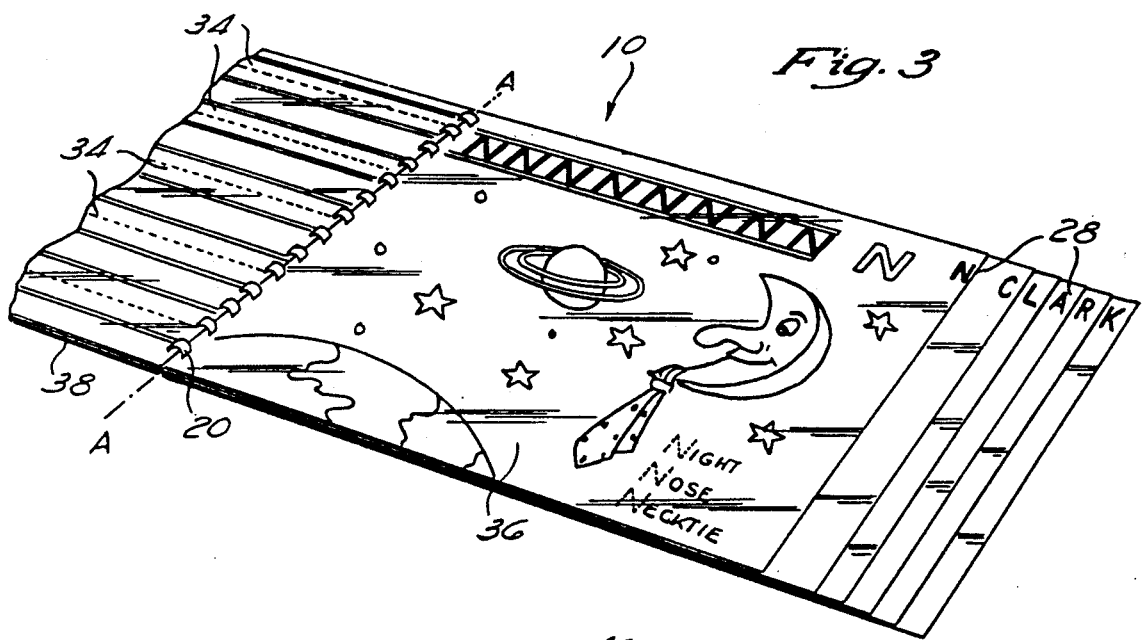
FIG. 3 shows a top perspective view of a portion of the book of this invention open to an interior page.

This invention provides a book that can be customized to teach letters, numbers, a series of letters, for example, a word such as a child's name and the like. The front cover has a window or opening through which through which the series of letters or the like can be seen. The series of letters, e.g. forming a word is formed by first providing a plurality of pages, each page (or portion of a page), perferably being of different length from the immediately underlying and adjacent page, the length being measured from the binding axis for the pages. Each of the pages preferably bears at the edge remote from the binding axis the symbol (usually letters or numerals) and these symbols will form some logical combination, as for example, a name or data. All of the symbols forming the logical sequence are then seen through the window when the book is in its fully closed position.

Thus, one specific aspect of this invention is a book comprising:
a book cover having an elongate window portion;
a means for binding pages;
a plurality of pages bound within the book, each page having at least a portion being of different length as measured from the means for binding pages; and
a symbol being affixed to the outer edge of each page such that when the book is closed said symbols on said plurality of pages forms a sequence of symbols, visible through said window portion of said book cover.

DETAILED DESCRIPTION

Referring to FIG. 1, a closed book 10 shows the name "JASON CLARK" 12 through a transparent window or opening 14 extending along the top edge 16 of the book, and ending at the right edge 18 of the book. The book is entitled "I CAN SPELL MY NAME." The book is bound by a plastic ring binder 20.

Referring to FIG. 2, the book 10 is opened to the first page designated by the numeral 22. This page is by way of example, for the letter "J." A large exemplar of the letter 24 appears after a repeated series of the letter. A smaller exemplar 26 forms the initial letter of the word "JASON." Only the smaller exemplars 28 of the succeeding letters of the name are visible through the window or opening 14.

Shown below the exemplars are words 30 beginning with the exemplified letter, in this case "Jaguar," "Jungle," and "Jeep." An illustration is provided that depicts a fanciful jaguar driving a jeep in a jungle. The illustration shows the words and other important information on the right side of the page. The illustration can be cut from top to bottom any distance in from the binding axis A—A. The binding means is coincident with the binding axis A—A. All pages are bound at the binding axis.

The cover 32 has been opened and laid flat. The transparent window or opening 14 is attached near the top edge of the cover. A series of parallel lines 34 provide a space for the child to practice writing the letter.

Referring to FIG. 3, a page 36 from the interior of the book 10 is visible when the book is opened and laid flat. The preceding pages 38 are laid flat on top of the cover. It can be seen that the illustrations can be cut parallel to the outer left edge or the binding axis AA anywhere from the upper edge without destroying the teaching portion of the illustration. Therefore, one master set of sheets of letters can be cut to provide the pages in the book. For example, the "a" in "JASON" and the "a" in "CLARK" can be cut from the same master "a" sheet. It is to be noted that the vertical parallel cut is shown as extending from upper to lower edge of the page; however, the cut need not extend all the way to the lower edge. It may terminate just below the "n" on page 36 and the cut may then extend horizontally to the right hand edge of the page.

Figure 4:
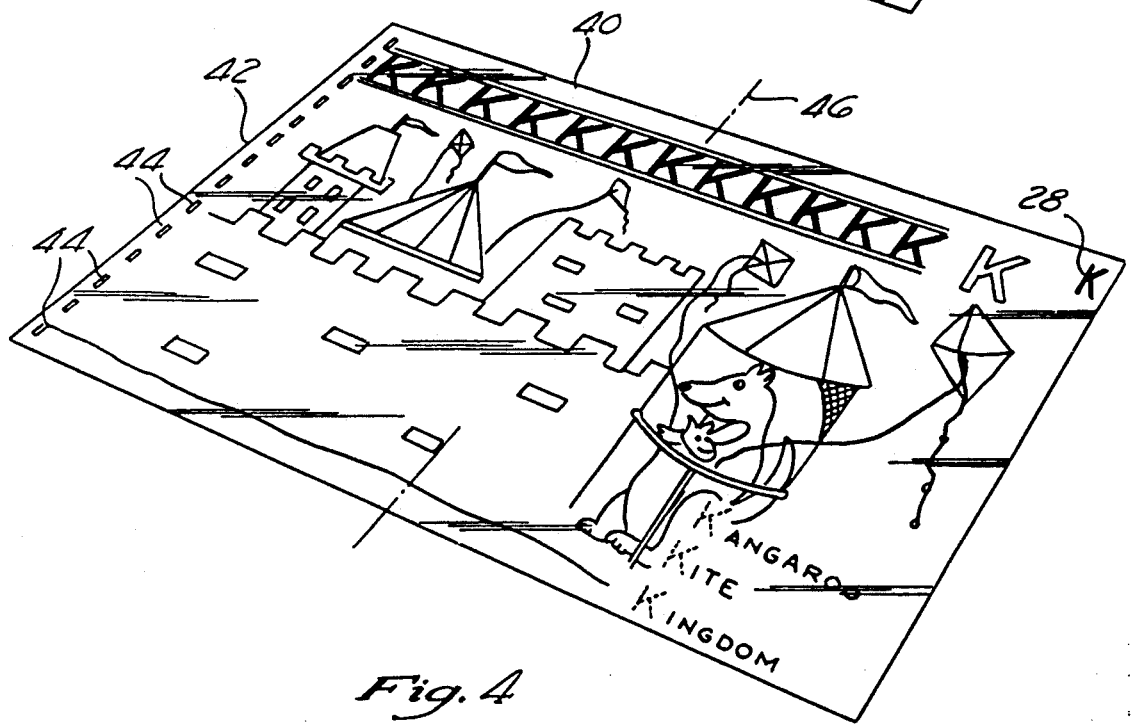
FIG. 4 shows a top perspective view of one page removed from the book of this invention.

Referring to FIG. 4, an uncut unbound sheet 40 shows all the information of the master sheet. The sheet is full sized since "K" is the last letter of the series of letters. The left edge 42 is perforated with a series of holes 44 to receive a plastic ring binder. A line 46, in phantom, shows the maximum displacement to the right a cut can be made. A cut from the top to the bottom further to the right will start to remove needed information on the page. On the page shown, a cut further to the right would leave too few exemplars of "k" and the drawing of the kangaroo would be progressively destroyed.

The type of binding chosen is not critical. A loose leaf type binding is preferred since the pages tend to lie flatter with this type binding. However, other well known book bindings, for example, the bindings of hardcover books, softcover, and spiral binds, Velo ® bindings, even staples are all within the scope of this invention.

The binding should be one amenable to binding sheets of different length. Each sheet is preferably cut from a master sheet. The cut (right hand) edge is then prepared to be bound into a book format. For example, when a plastic ring binder is used, the series of holes 44 is punched into the binding edge with a standard punch.

The illustrated side of the page is shown. The opposite side is blank (as shown in FIGS. 2 and 3), except for parallel lines to aid in aligning practice letters.

Other uses can be envisioned for the book of this invention. A set of letters comprising the entire alphabet could be used to teach the alphabet. Numbers can be included for teaching counting or teaching addresses. Although suitable for teaching languages that use the Latin alphabet other alphabets, for example, Greek, Russian, Hebrew, or even Arabic, both of which read from right to left can be taught using this invention. In that case the binding would be on the right side.

The binding can be on any side as long as a series of symbols, one on each page, appears in the window. This invention should not be construed as limited to any particular location of binding or even to rectangular pages.

In use the child flips through the pages, learning in sequence, each letter of his name. The child can practice each letter by tracing and practicing on the page open opposite the illustration. Preferably, the pages are plastic or plastic coated so that crayon or similar ink is easily erased by wiping.

I claim:

1. A customized book-making kit having component parts capable of being assembled into a customized book, the kit comprising the combination of:
   a book cover having an elongate window portion;
   a means for binding pages; and
   a plurality of pages bound within the book each page of the plurality of pages being adapted to be cut from standard sized master pages bearing illustrative subject matter and a symbol, wherein each page has at least a portion being of a different length as measured from the means for binding pages, said symbol appearing near the outer edge of each page and said illustrative subject matter being printed on substantially the remainder of each page, whereby, in assembly of said components of said kit, at least one of said plurality of pages are cut from said standardized sheets and said plurality of said pages are arranged in an order such that when the book is closed, said symbol on said plurality of pages forms a logical sequences of symbols, visible through said window portion of said book cover.

2. The customized book-making kit of claim 1, wherein the window is covered with a transparent sheet.

3. The book of claim 1, wherein the symbols are letters of the alphabet.

4. The book of claim 3, wherein the sequence of letter forms at least one word.

5. The book of claim 4, wherein said at least one word is a name.

6. The book of claim 1, wherein each page has one side having an exemplar of a symbol and a reverse side substantially blank for practice.

7. The book of claim 1, wherein the reverse side of each page has parallel lines to aide in writing practice.

8. The book of claim 1, wherein a portion of said illustrative subject matter is removed from the pages cut from the standard size master page without detracting from the overall integrity of the illustrative subject matter.

9. The book of claim 1, wherein said binding means comprises a series of holes punched along an edge of each page and said book cover and a binding member which partially passes through said series of holes to hold said plurality of pages and said book together.

10. A method of making a customized book, comprising the steps of:
    (a) providing a book cover having an elongate window portion and a binding edge;
    (b) providing a plurality of initially equal-length pages, each of said plurality of pages having a symbol appearing near an outer edge of each said page;
    (c) cutting at least one of said plurality of pages parallel to a binding edge of said page to reduce one dimension of said page, such that after cutting, each cut page will have a different length as measured from said binding edge; and
    (d) binding said plurality of cut and uncut pages of said book and said cover along their binding edges such that when the book is closed, said symbols on said plurality of pages forming a logical sequence of symbols, visible through said window portion of said book cover.

11. The method of claim 10, wherein said window portion is covered with a transparent sheet.

12. The method of claim 10, wherein said symbols are letters of an alphabet.

13. The method of claim 12, wherein the sequence of letters form at least one word.

14. The method of claim 13, wherein said at least one word is a name.

15. The method of claim 10, wherein each said page having a symbol also has illustrative subject matter appearing on the same side, whereby in said cutting step, a portion of said illustrative subject matter is removed without damaging the overall integrity of said illustrative subject matter.

16. The method of claim 10, wherein each said page having a symbol has a reverse side printed with parallel lines to aid in writing practice.

17. The method of claim 10, wherein after said cutting step, each binding edge of each page of the book and said book cover are punched with a series of apertures to receive a binding means in said binding step.

18. A method of making a customized book from prepared pages comprising the steps of:
    (a) providing a book cover having an elongate window portion and a binding edge;
    (b) providing a plurality of initially equal-length pages to be bound within the book, each of said plurality of pages having a letter appearing near an outer edge of each said page opposite a binding edge of each page, and illustrative subject matter appearing thereon;
    (c) cutting at least one of said plurality of pages parallel to its binding edge to reduce the length of said page, said cutting step ensuring that each page has a different length as measured from the binding edges, said cutting step resulting in a portion of said illustrative subject matter to be excised from said page without detracting from the overall integrity of said illustrative subject matter; and (d) binding said plurality of pages and said book cover along their binding edges such that when said book is closed, said letters on said plurality of pages form a name, visible through said window portion of the said book cover.

19. The method of claim 18, wherein the opposite side of each page bearing the illustrative subject matter has a plurality of parallel lines printed thereon to aid in writing practice.

20. The method of claim 19, wherein after said cutting step, each binding edge of each page of the book and said book cover are punched with a series of apertures to receive a binding means in said binding step.

* * * * *